(12) United States Patent
Morita et al.

(10) Patent No.: US 12,484,888 B2
(45) Date of Patent: Dec. 2, 2025

(54) ENDOSCOPIC TREATMENT DEVICE, AND USAGE METHOD THEREOF

(71) Applicants: OLYMPUS CORPORATION, Tokyo (JP); NATIONAL UNIVERSITY CORPORATION KOBE UNIVERSITY, Hyogo (JP)

(72) Inventors: Yoshinori Morita, Takarazuka (JP); Kunihide Kaji, Hachioji (JP); Nobuko Matsuo, Hachioji (JP); Takuya Okumura, Hamburg (DE)

(73) Assignees: OLYMPUS CORPORATION, Tokyo (JP); NATIONAL UNIVERSITY CORPORATION KOBE UNIVERSITY, Hyogo (JP)

( * ) Notice: Subject to any disclaimer, the term of this patent is extended or adjusted under 35 U.S.C. 154(b) by 998 days.

(21) Appl. No.: 17/573,100

(22) Filed: Jan. 11, 2022

(65) Prior Publication Data

US 2022/0133290 A1    May 5, 2022

Related U.S. Application Data

(63) Continuation of application No. PCT/JP2019/027895, filed on Jul. 16, 2019.

(51) Int. Cl.
*A61B 17/02* (2006.01)
*A61B 17/04* (2006.01)
*A61B 17/06* (2006.01)

(52) U.S. Cl.
CPC .......... *A61B 17/02* (2013.01); *A61B 17/0469* (2013.01); *A61B 2017/0212* (2013.01); *A61B 2017/06057* (2013.01)

(58) Field of Classification Search
CPC ...... A61B 17/02–0293; A61B 17/0466; A61B 2017/00805; A61F 2/0004–0095
See application file for complete search history.

(56) References Cited

U.S. PATENT DOCUMENTS 1,441,298 A    1/1923  Pineiro
4,753,237 A    6/1988  Puchy
(Continued)

FOREIGN PATENT DOCUMENTS

JP    01-122711 U    8/1989
JP    2007-282841 A    11/2007
(Continued)

OTHER PUBLICATIONS

International Search Report dated Aug. 27, 2019 received in PCT/JP2019/027895.
(Continued)

*Primary Examiner* — Thaddeus B Cox
(74) *Attorney, Agent, or Firm* — Scully, Scott, Murphy & Presser, P.C.

(57) ABSTRACT

A tissue traction device includes a first needle connected to a distal end of a first thread; a second needle connected to a distal end of a second thread; an elongated main body connected to the first thread and extending between the first thread and the second thread, the main body including a first hole; and a tube disposed at a proximal end of the main body, wherein the second thread is inserted through the first hole to be advanceable and retractable at a position between the second needle and a distal end of the tube, and the tube and the second thread are configured to be relatively movable in a longitudinal direction of the tube.

14 Claims, 16 Drawing Sheets

(56) References Cited

U.S. PATENT DOCUMENTS

| | | | | |
|---|---|---|---|---|
| 4,798,205 A | * | 1/1989 | Bonomo | A61M 29/02 |
| | | | | 128/897 |
| 2002/0095166 A1 | * | 7/2002 | Vargas | A61B 17/11 |
| | | | | 606/153 |
| 2005/0171404 A1 | * | 8/2005 | Mische | A61B 17/0293 |
| | | | | 600/231 |
| 2009/0221868 A1 | * | 9/2009 | Evans | A61F 2/0045 |
| | | | | 600/37 |
| 2010/0174298 A1 | | 7/2010 | Ceschin | |
| 2012/0130389 A1 | * | 5/2012 | Prywes | A61F 9/00736 |
| | | | | 606/107 |
| 2014/0243890 A1 | | 8/2014 | Dumot | |
| 2017/0119371 A1 | * | 5/2017 | Mims | A61B 17/0482 |
| 2018/0035996 A1 | * | 2/2018 | Goss | A61B 17/0218 |
| 2018/0263613 A1 | * | 9/2018 | Wik | A61B 17/02 |
| 2019/0133573 A1 | * | 5/2019 | Anderson | A61F 2/0095 |

FOREIGN PATENT DOCUMENTS

| | | |
|---|---|---|
| JP | 4805293 B2 | 11/2011 |
| JP | 2017-522086 A | 8/2017 |
| WO | 2015/195568 A1 | 12/2015 |

OTHER PUBLICATIONS

Chinese Office Action dated Mar. 25, 2024 received in 201980098421.3.

\* cited by examiner

ENDOSCOPIC TREATMENT DEVICE, AND USAGE METHOD THEREOF

TECHNICAL FIELD

The present disclosure relates to an endoscopic treatment device, and a usage method of the endoscopic treatment device.

The present application is a continuation application of PCT International Application No. PCT/JP2019/027895, filed on Jul. 16, 2019. The content of the above-identified PCT International Applications is incorporated herein by reference.

BACKGROUND ART

There are procedures to remove a part of the stomach wall using an endoscope and a treatment device passing through the endoscope. According to the Endoscopic Submucosal Dissection (ESD), a relatively large area of the mucosal layer and a portion of the submucosal layer are dissected so as to result in a tissue deficient area. According to the Endoscopic Full-thickness Resection (EFTR), a relatively large area of the stomach wall is resected over the entire layer so as to create an opening in the stomach wall.

In order to complete the procedures, it is necessary to suture and close the tissue deficient area including the opening (hereinafter referred to as "opening"). The closing procedures are performed by hooking a thread on two sites of the surrounding tissue around the opening and then pulling the thread so as to gather the two sites where the thread is hooked close to each other. When the area of the opening is large, the distance between the two sites becomes large, and the movement amount of the needle for hooking the thread also becomes large. In a case in which the opening is large, it is necessary to hook the thread at more sites. Accordingly, it is not easy to close the opening with a treatment device protruding from the endoscope.

As a method of closing the opening, a method of using a plurality of clips as described in Japanese Patent (Granted) Publication No. 4805293 is also known. Even when the opening is closed with the clips described in Japanese Patent (Granted) Publication No. 4805293, it is necessary to hook the arm at two sites in the surrounding tissues around the opening. However, the arm is slippery with respect to the tissue, and a reaction force is generated when pulling the tissue such that it takes the same or more effort to close the opening as when hooking the threads.

SUMMARY

According to an aspect of the present disclosure, a tissue traction device includes a first needle connected to a distal end of a first thread; a second needle connected to a distal end of a second thread; an elongated main body connected to the first thread and extending between the first thread and the second thread, the main body including a first hole; and a tube disposed at a proximal end of the main body, wherein the second thread is inserted through the first hole to be advanceable and retractable at a position between the second needle and a distal end of the tube, and the tube and the second thread are configured to be relatively movable in a longitudinal direction of the tube.

According to another aspect of the present disclosure, a tissue traction device includes a first thread; a second thread; an elongated main body connected to the first thread and extending between the first thread and the second thread, the main body including a first hole; and a tube disposed at a proximal end of the main body, wherein each of the first thread and the second thread includes a ring-shaped portion, the ring-shaped portion of the first thread protrudes from the main body, the ring-shaped portion of the second thread protrudes from the tube, the second thread is inserted through the first hole to be advanceable and retractable at a position between the ring-shaped portion of the second thread and a distal end of the tube, and the tube and the second thread are configured to be relatively movable in a longitudinal direction of the tube.

According to further aspect of the present disclosure, a usage method of a tissue traction device including a first thread, a second thread, and a tube includes fixing the first thread to a first fixation site of a luminal organ; fixing the second thread to a second fixation site of the luminal organ, the second fixation site being apart away from the first fixation site; forming an opening by resecting tissues between the first fixation site and the second fixation site; relatively moving the tube and the second thread to increase a distance between the first fixation site and the second fixation site so as to elongatedly stretch the opening while gathering the surrounding tissues around the opening, and performing treatment to the surrounding tissues and closing the opening.

DESCRIPTION OF EMBODIMENTS

A first embodiment of the present disclosure will be described with reference to FIGS. 1 to 9.

Figure 1:
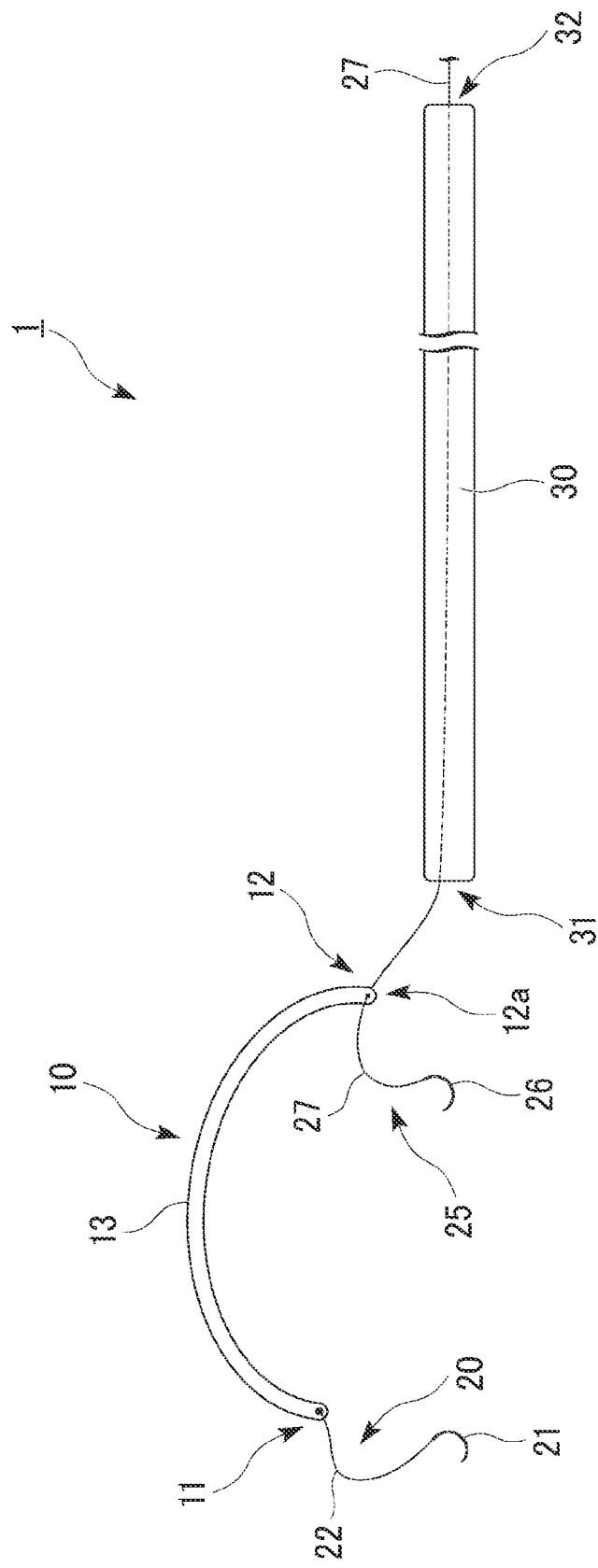
FIG. 1 is an overall view showing a tissue traction device according to a first embodiment of the present disclosure.

FIG. 1 is an overall view of a tissue traction device 1 according to the present embodiment. The tissue traction device 1 is an endoscopic treatment device including an elongated main body 10, two fixing elements as a first fixing element 20 and a second fixing element 25 provided at both ends of the main body 10, and a sheath (tube) 30 provided on the proximal end side of the main body 10.

The main body 10 is made of resin, metal, or the like and is formed in an elongated shape such as a rod shape, a strip shape, or a tubular shape. The main body 10 has a distal end portion 11, a proximal end portion 12, and an intermediate portion 13 between the distal end portion 11 and the proximal end portion 12. The intermediate portion 13 is bent in an arc shape (first bent shape) in a natural state where no external force is applied thereto. The main body 10 has flexibility.

The first fixing element 20 has a first needle 21 and a first thread 22. The first needle 21 is a bent needle, the first needle 21 is connected to the distal end of the first thread 22, and the proximal end of the first thread 22 is connected to the main body 10.

The second fixing element 25 has a second needle 26 and a second thread 27. The second needle 26 is also a bent needle. The second needle 26 is connected to the distal end of the second thread 27, and the proximal end of the second thread 27 is inserted into a hole 12a of the main body 10 (shown enlarged in FIG. 2) to be freely advanceable and retractable. The main body 10 and the second thread 27 are connected to each other. The body 10 extends between the proximal end of the first thread 22 and the proximal end of the second thread 27. The second thread 27 protruding from the sheath 30 can slide in the hole 12a between the second needle 26 and the distal end of the sheath 30.

The sheath 30 is a flexible tubular member and has lumens extending along a longitudinal axis. The second thread 27 can advance and retreat with respect to the sheath 30. As shown in FIG. 1, the second thread 27 is preferably arranged to enter the sheath 30 through the distal end opening 31 of the sheath 30 and exit from the proximal opening 32 through the lumen (hole) of the sheath 30. Instead of the lumen, a guide hole through which the second thread 27 passes may be formed only at the distal end portion of the sheath 30. In this case, the second thread 27 may pass through the guide hole, and the second thread 27 coming out from the guide hole may be arranged to come out from the forceps port via the channel of the endoscope.

The operations when the tissue traction device 1 having the above-described configuration according to the present embodiment is used will be described. In the following description, an example will be taken in which a part of the wall of a luminal organ such as the stomach is completely resected by EFTR or the like.

First, a user introduces the tissue traction device 1 together with the endoscope into the body as the treatment target.

Figure 2:
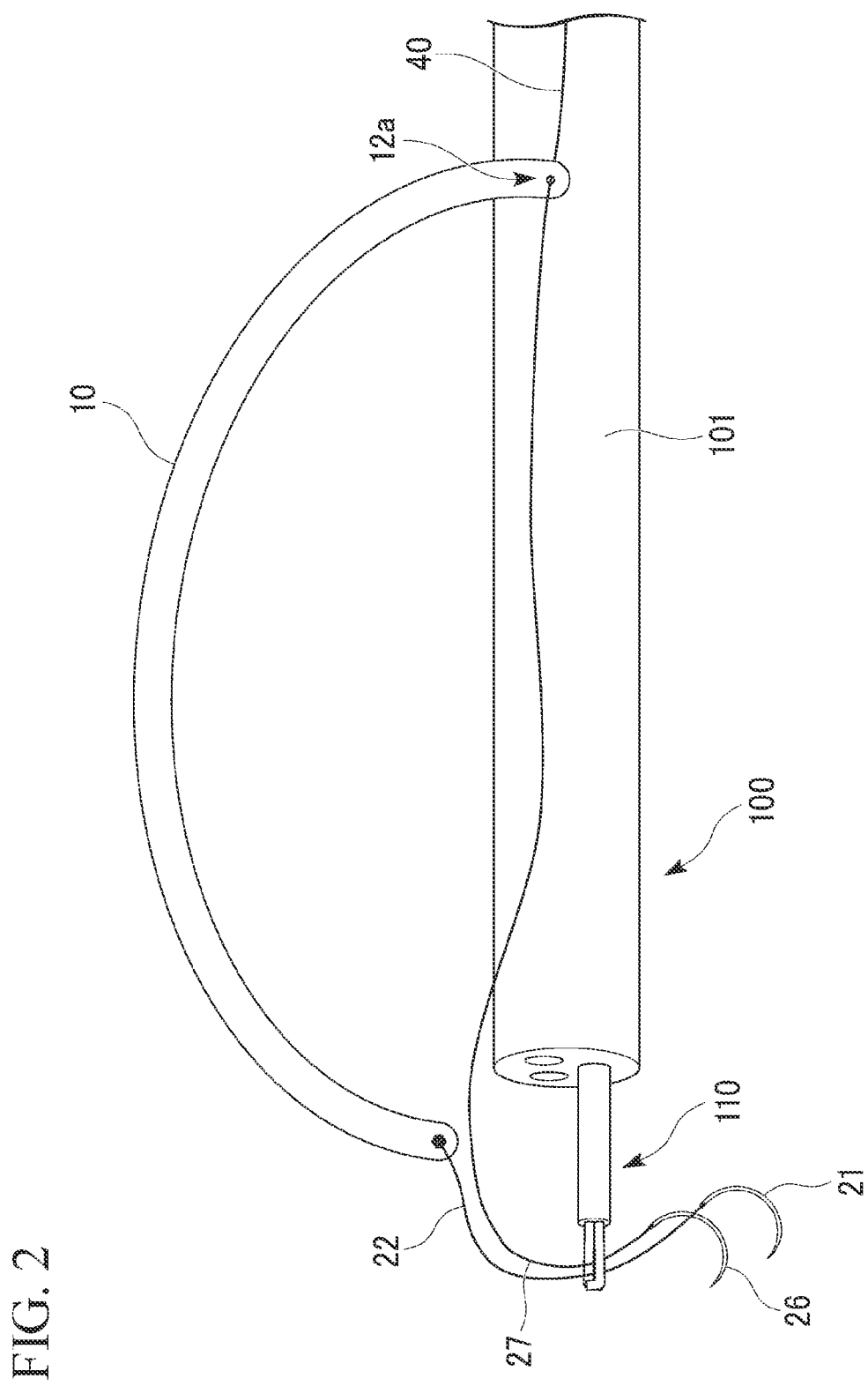
FIG. 2 is a view showing the tissue traction device when being introduced into the body together with an endoscope.

FIG. 2 shows an example of the endoscope 100 and the tissue traction device 1 when being introduced into the body. The endoscope 100 and the tissue traction device 1 are introduced into the body through the mouth or the like while the main body 10 is placed along the insertion portion 101 of the endoscope 100 in a state in which the two fixing elements are grasped by the forceps 110 or the like inserted into the endoscope 100. In FIG. 2, the sheath 30 (not shown) is removed from the second thread 27; however, the sheath 30 may be introduced into the body together with the second thread 27 passing through the sheath 30.

In FIG. 2, the first thread 22 and the second thread 27 are grasped by the forceps 110; however, the first needle 21 and the second needle 26 may be grasped. A cap may be attached to the distal end of the endoscope 100, and the first needle 21 and the second needle 26 may be positioned in the cap and then introduced into the body.

The user confirms a region R as the dissection target by the endoscope 100, and determines the positions of two fixation sites for fixing the fixing element in the surrounding tissue ST around the region R. When the fixations sites are set one by one at positions sandwiching the region R in the advancing-retreating direction of the endoscope 100, the procedures of closing the opening later can be easily performed. The distance between the two fixation sites is set shorter than the distance between the distal end portion 11 and the proximal end portion 12 in the main body 10.

Next, the user hooks the first needle 21 at the fixation site F1 (first fixation site) on the back side (the position farther from the endoscope 100) by the forceps such as a needle holder protruding from the endoscope 100 and locks the first thread 22 to the fixation site F1. Further, the user uses the forceps to hook the second needle 26 on the other fixation site F2 (second fixation site), and the second thread 27 is locked to the fixation site F2.

Figure 3:
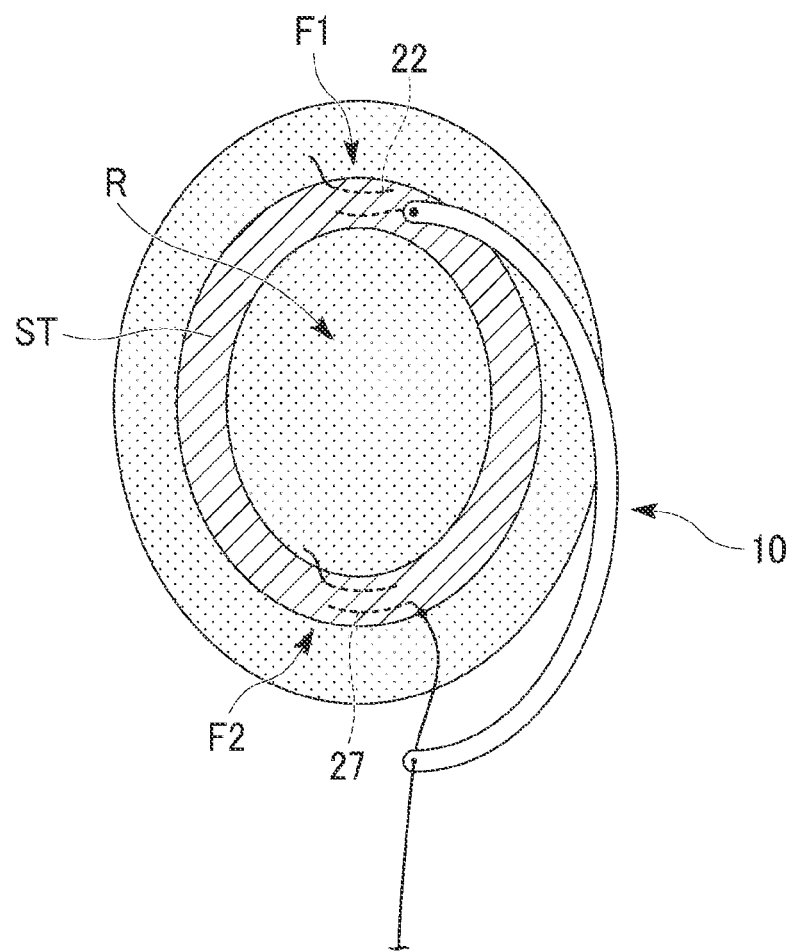
FIG. 3 is a view showing a procedure of the full-thickness resection with respect to the gastrointestinal tract using the present tissue traction device.

Accordingly, as shown in FIG. 3, the attachment of the tissue traction device 1 to the gastrointestinal wall has been finished. Either of the fixation of the fixing element to the fixation site F1 or the fixation of the fixing element to the fixation site F2 may be performed at first. In the case of performing the EFTR, if a part of the gastrointestinal tract is dissected and an opening (described later) is formed, the gastrointestinal tract is deflated and it becomes difficult to fix the gastrointestinal tract. Accordingly, it is preferable to perform the attachment of the tissue traction device 1 to the gastrointestinal wall (locking by the first thread 22 and the second thread 27) before performing the full-thickness resection.

Figure 4:
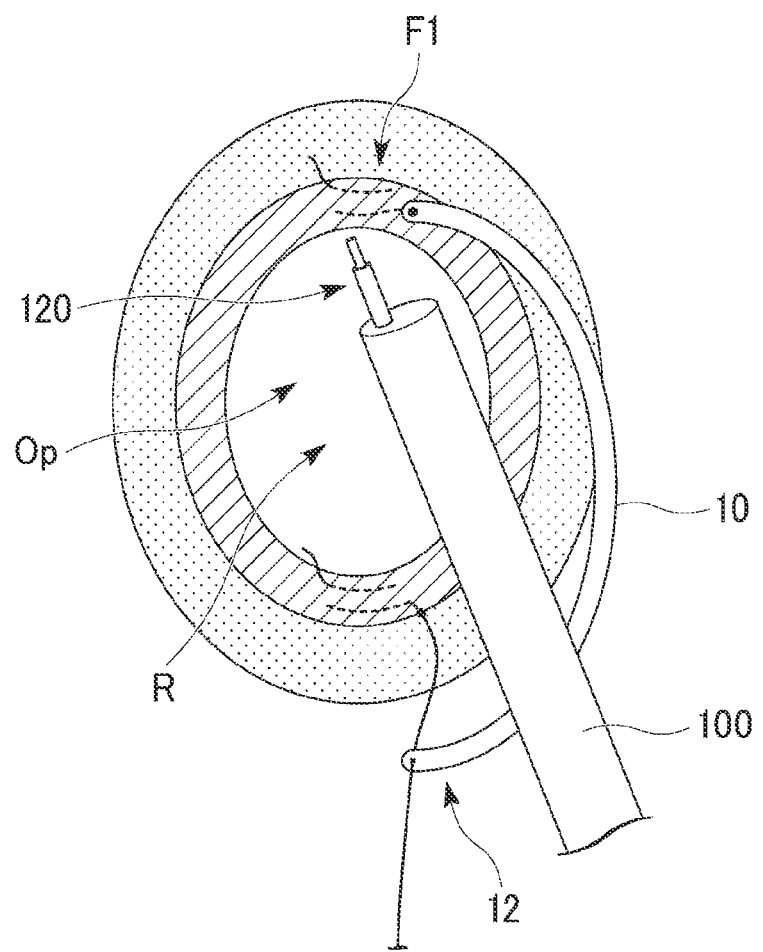
FIG. 4 is a view showing a procedure of the full-thickness resection with respect to the gastrointestinal tract using the present tissue traction device.

Next, as shown in FIG. 4, the user performs the full-thickness resection with respect to the region R using a high-frequency knife 120 or the like. Since the main body 10 is in an arc shape in the natural state and the proximal end portion 12 has not yet been fixed to the fixation site F2, even if the fixing element on the distal end side is fixed to the fixed portion F1, it is still difficult to extend over the region R and it is difficult for the main body 10 to interfere with the full-thickness resection procedures. In addition, it is easy to evacuate the main body 10 even when the main body 10 extends over the area R.

By the full-thickness resection procedures, an opening Op is formed in the region R. In a case in which the target procedure is ESD, a bottomed opening is formed in the region R where the mucosal layer is resected together with a part of the submucosal layer.

After the full-thickness resection is completed, the user passes the end portion of the second thread 27 outside the body through the sheath 30 and introduces the sheath 30 into the body along the second thread 27. In the case in which it becomes difficult for the sheath 30 to move due to the interference with the gastrointestinal wall on the way, the endoscope 100 may be once retracted to check the situation of the interference site, and the endoscope, the treatment tool, or the like may be used to assist the introduction of the sheath 30.

When the distal end of the sheath 30 reaches the vicinity of the main body 10, the user brings the distal end of the sheath 30 into contact with the proximal end portion 12 of the main body 10 while observing the main body 10 with the endoscope 100.

The user moves the second thread 27 and the sheath 30 relative to each other so as to retract the second thread 27 with respect to the sheath 30. Then, the distal end portion 11 of the main body 10 pushed by the sheath 30 moves forward. Along with this, the tissues (fixation site F1) locked to the first thread 22 connected to the distal end portion 11 moves to the distal end side. Since the second thread 27 is locked to the fixation site F2, the fixation site F2 does not completely follow the movement of the fixed portion F1, and the distance between the fixed portion F1 and the fixation site F2 gradually increases.

Figure 5:
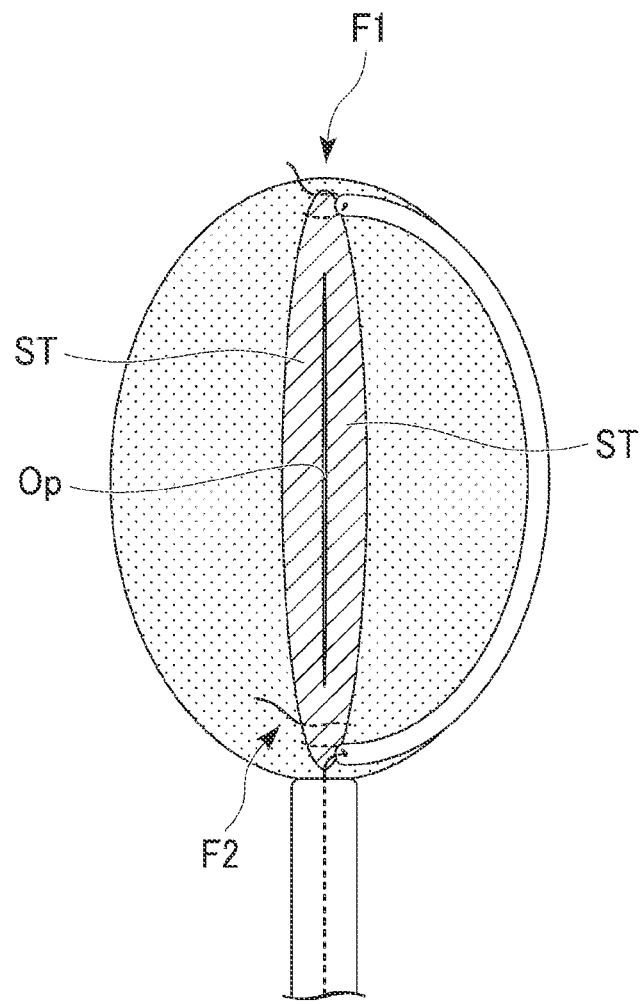
FIG. 5 is a view showing a procedure of the full-thickness resection with respect to the gastrointestinal tract using the present tissue traction device.

As a result, as shown in FIG. 5, the opening Op is elongated and deformed in the extending direction along the line connecting the fixation site F2 and the fixation site F1. As a result, the surrounding tissues ST around the opening Op also approach each other. By the user holding a part (operation portion) of the sheath 30 and the second thread 27 located outside the body, the user can maintain the opening Op in the stretched state.

Basically, it is desirable that the main body 10 has a rigidity that hardly deforms even when the sheath 30 is pressed. When the main body 10 is pushed by the sheath 30, the same effect can be achieved even if the intermediate portion 13 of the main body 10 is deformed into a second bent shape having a curvature radius slightly smaller than that of the first bent shape.

There is no particular limitation on the aspect for relatively moving the second thread 27 and the sheath 30. For example, the second thread 27 may be pulled while holding the sheath 30, or the sheath 30 may be pushed while holding the second thread 27. Alternatively, the second thread 27 may be pulled while pushing the sheath 30. If the proximal end portion 12 cannot be sufficiently pressed by the sheath 30, the pressing force may be added by pressing the endoscope 100 or grasping the sheath with the forceps protruding from the endoscope. As another example, a pair of forceps or the like having a grasping function may be provided at the distal end of the sheath 30, and the main body 10 may be directly grasped by the pair of forceps or the like to push the main body 10.

Figure 6:
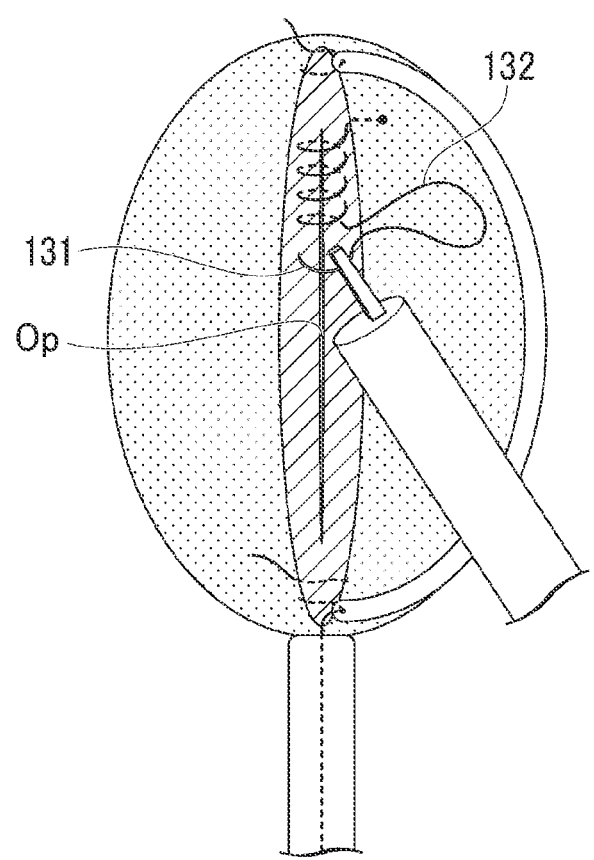
FIG. 6 is a view showing a procedure of the full-thickness resection with respect to the gastrointestinal tract using the present tissue traction device.

As shown in FIG. 6, the user sutures and closes the opening Op using a needle 131 and a thread 132 separately introduced into the body while maintaining the stretched state of the opening Op. Since the opening Op is stretched, the surrounding tissue ST around the opening Op is close to each other such that the needle can be hooked on the surrounding tissue ST of the opening Op with a small movement amount of the needle, and it becomes easier to perform the suture than the conventional configuration.

Instead of the needle 131 and the thread 132, other medical devices such as clips and staplers may be used to close the opening Op.

Figure 7:
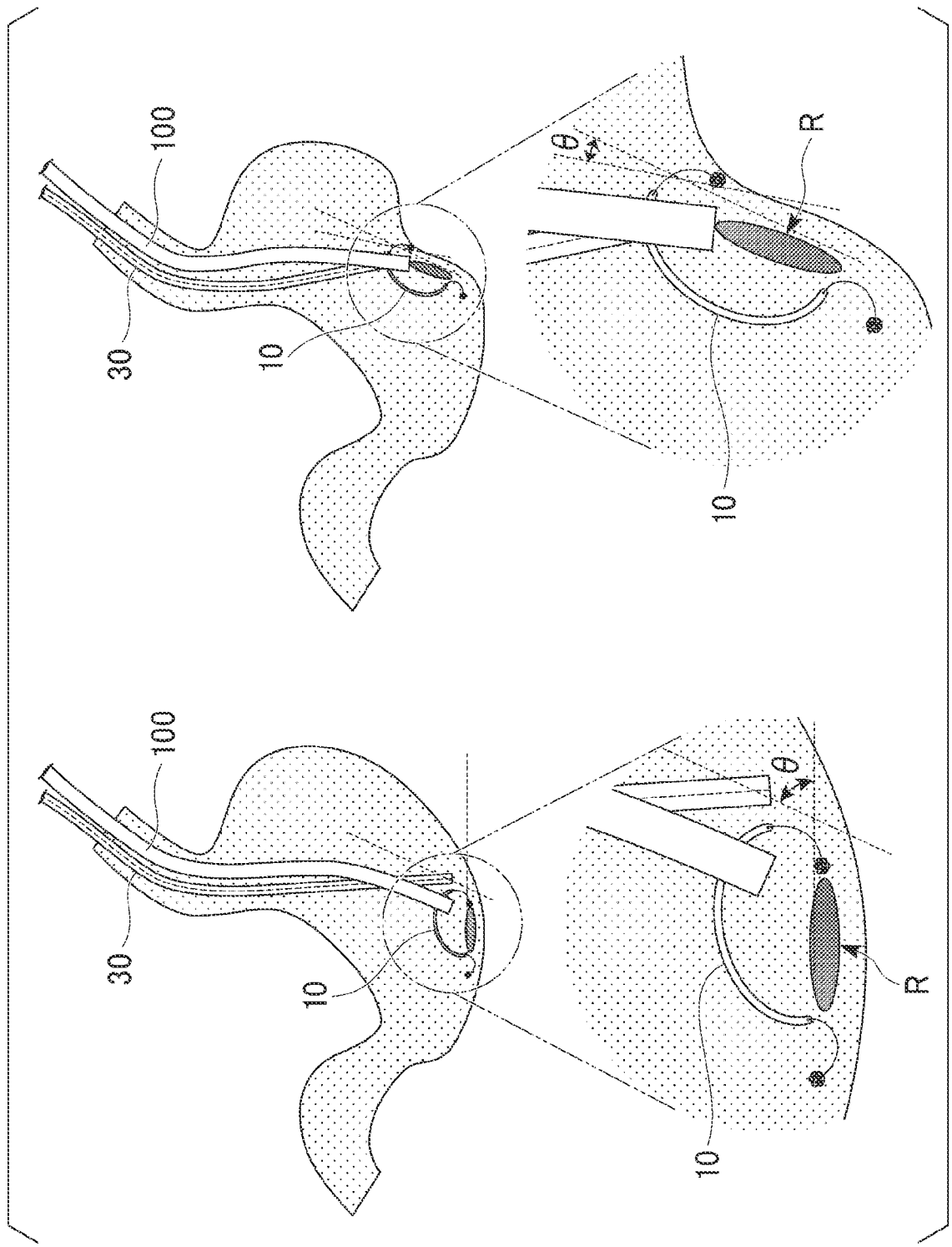
FIG. 7 is a view showing an example of an angle adjustment operation between the tissues to be sutured and the endoscope.

As shown in FIG. 7, when the second thread 27 and the sheath 30 are pulled while maintaining the positional relationship thereof, the fixation site F2 can be pulled toward the mouth side. Such operations are useful for adjusting an angle θ formed by the tangential direction of the tissues of the luminal wall as the closing target and the longitudinal axis of the forceps protruding from the endoscope 100.

After the opening Op has been closed by the suturing, the user cuts the first thread 22 and the second thread 27 to separate the tissue traction device 1 from the gastrointestinal tract. Finally, the entire tissue traction device 1 including the first needle 21 and the second needle 26 is removed from the body together with the endoscope 100 to complete the series of procedures.

The first needle 21 and the second needle 26 may be recovered immediately after the attachment of the tissue traction device 1 to the gastrointestinal wall is completed.

As described above, the tissue traction device 1 according to the present embodiment is configured to fix the first fixing element 20 and the second fixing element 25 provided at both ends of the main body 10 at the two fixation sites around the region to be resected, and then by relatively moving the sheath 30 and the second thread 27 in a predetermined direction so as to elongatedly stretch the region after forming the opening and the resection to gather the surrounding tissues around the region close to each other. As a result, the procedures for closing the opening can be performed more easily than the conventional operations.

According to the present embodiment, the configuration of the fixing element is not limited to the needle and the thread described above, and various structures may be adopted. According to a modification example shown in FIG. 13, rings 71, 72 are configured as the fixing elements. The ring 71 is formed by forming the first thread 22A into a ring shape and connecting both end portions to the distal end portion 11 of the main body 10. The ring 72 is formed by forming a part of the second thread 27A into a ring shape. The second thread 27 is inserted through the sheath 30, and the second thread 27 including the ring 72 protrudes from the distal end of the sheath 30. The second thread 27 protruding from the sheath 30 is inserted into a hole 12a formed in the proximal end portion of the main body 10 so as to be freely advanceable and retractable between the ring 72 and the distal end of the sheath 30.

Figure 14:
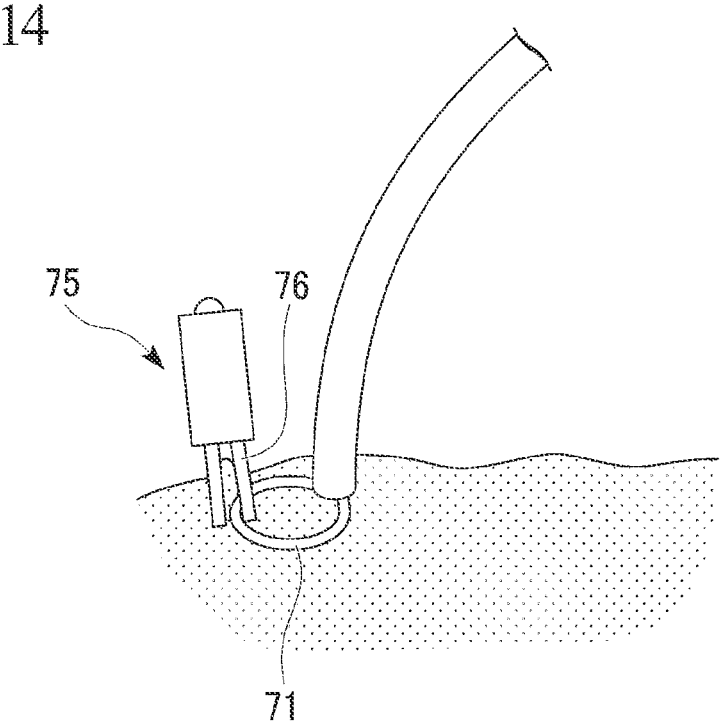
FIG. 14 is a view showing a state in which the fixation element is locked to the tissues.

When the ring 71 is positioned on the tissues, as shown in FIG. 14, one arm 76 of the endoscopic clip 75 is positioned in the ring 71 such that the tissue is ligated with the clip 75, the ring 71 can be locked to the tissues. Similarly, the ring 72 can also be locked to the tissues by ligating the tissues with the clip 75 or the like. The material of the rings 71, 72 is not limited to the first thread and the second thread; however, if the rings 71, 72 are formed from the material that can be easily cut such as the thread, it is easy to separate the tissue traction device from the tissue after being used.

Figure 8:
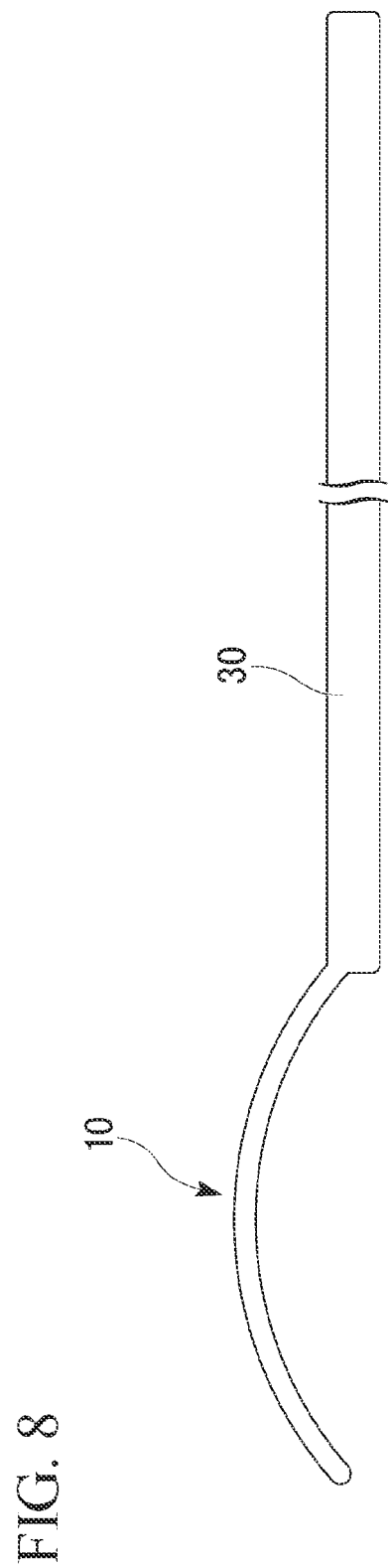
FIG. 8 is a view showing a main body and a sheath according to a modification example of the present tissue traction device.

According to the present embodiment, as shown in FIG. 8, the main body 10 and the sheath 30 may be connected with each other. According to a modification example having such a configuration, it is not necessary to pass the second thread 27 through the main body 10. Further, the operations of bringing the distal end of the sheath 30 into contact with the proximal end portion 12 of the main body 10 when stretching the opening is unnecessary and the operations of advancing the main body becomes stable.

The material of the main body 10 and the material of the sheath 30 may be the same or different.

Figure 9:
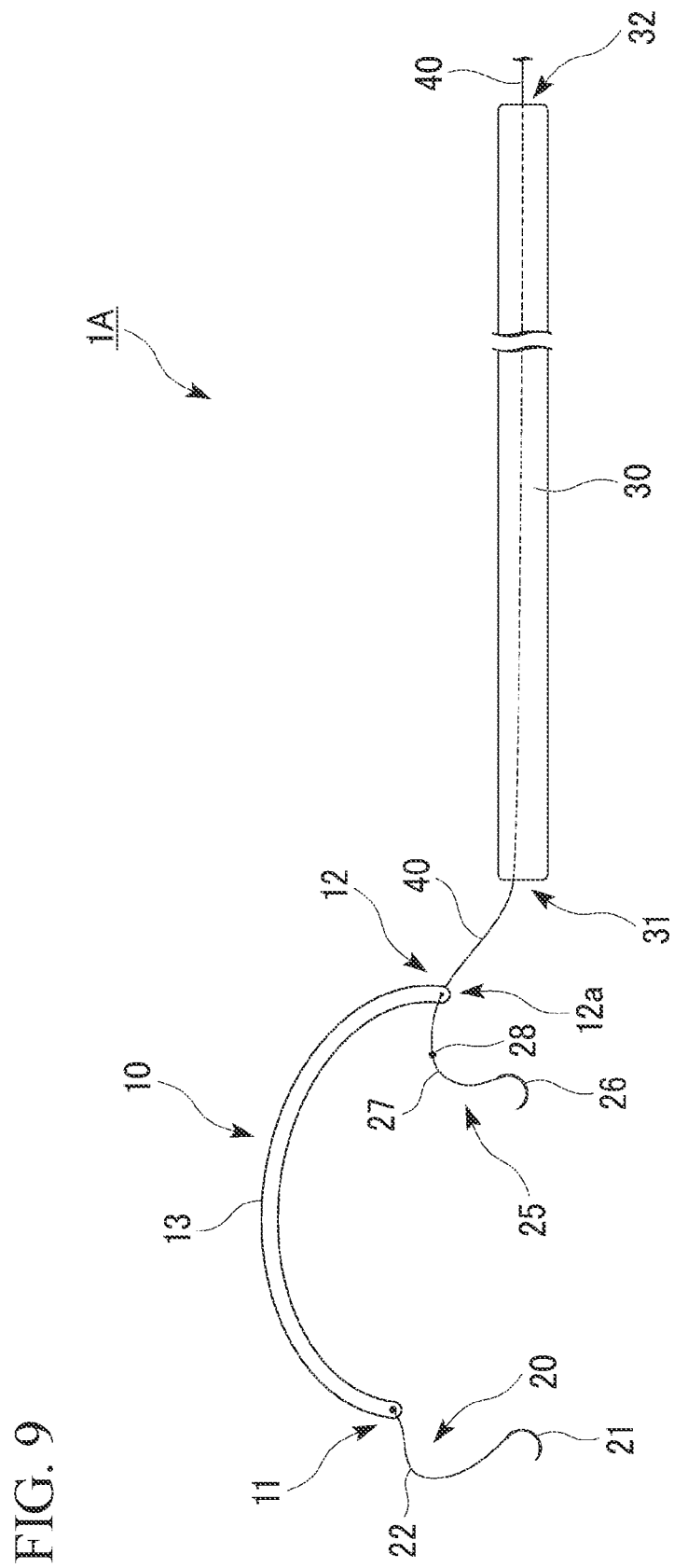
FIG. 9 is a view showing a modification example of the present tissue traction device.

The tissue traction device 1A according to a modification example as shown in FIG. 9 has a configuration in which a traction lead 40 is connected to the second thread 27. The lead 40 is an elongated member, and for example, the lead 40 is preferable to be a wire or a thread. According to this modification, the second thread 27 is short, and the second thread 27 and the lead 40 are connected at a knot 28. The lead 40 is passed through the hole 12a of the main body 12, and the knot 28 has a size impossible to pass through the hole 12a.

In the tissue traction device 1A, the second thread 27 and the main body 10 are not connected to each other; however, the opening can be elongatedly stretched by almost the same operation as that using the tissue traction device 1. Furthermore, when the proximal end portion of the main body 10 comes into contact with the knot 28, the main body 10 does not move any further, such that it is possible to prevent the main body 10 from being pressed against the tissues more than necessary.

A second embodiment of the present disclosure will be described with reference to FIG. 10 and FIG. 11. In the following description, the same reference numerals will be given to the configurations common to those already described, and duplicate description will be omitted.

Figure 10:
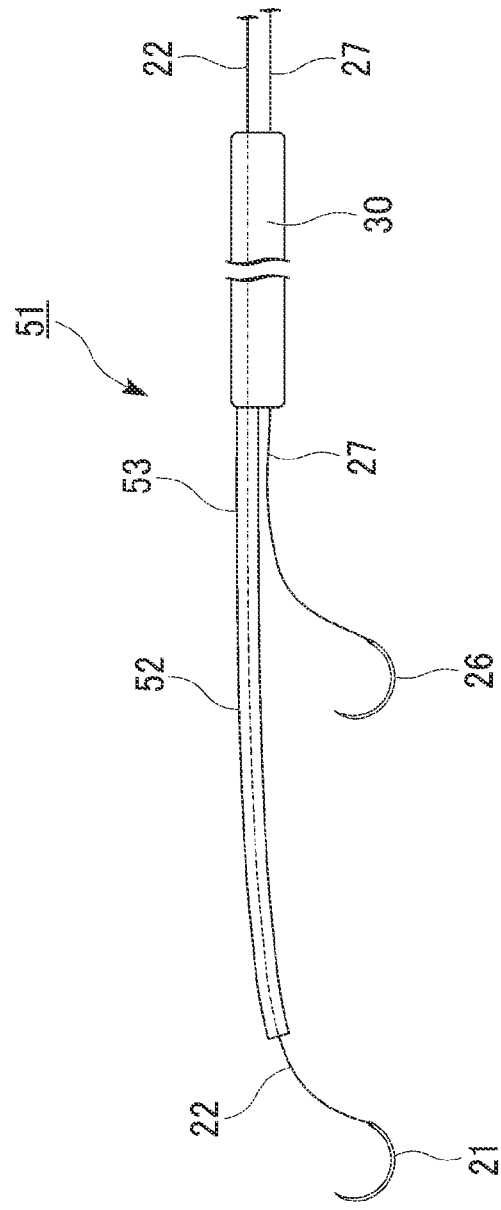
FIG. 10 is an overall view showing a tissue traction device according to a second embodiment of the present disclosure.
Figure 11:
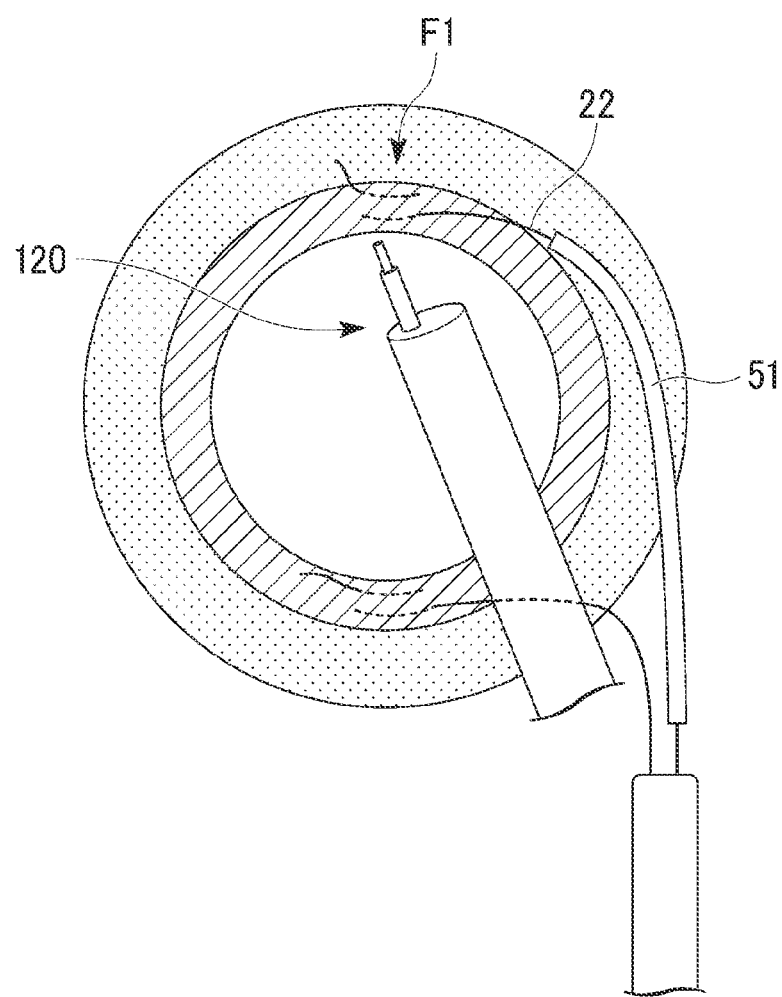
FIG. 11 is a view showing an embodiment when the present tissue traction device is used.

FIG. 10 shows a tissue traction device 51 according to the present embodiment. The tissue traction device 51 includes a tubular main body 52 instead of the main body 10 according to the first embodiment. The main body 52 has a substantially linear shape. The first thread 22 is connected to the main body 52 by passing through the main body 52. The first thread 22 is inserted into the sheath 30 from the proximal end portion 53 of the main body 52.

The second thread 27 is not connected to the main body 52; however, the second thread 27 is passed through the sheath 30.

Other configurations are the same as those of the tissue traction device 1 according to the first embodiment.

Similarly to the first embodiment, the tissue traction device 51 according to the present embodiment can elongatedly stretch the opening by relatively moving the second thread 27 and the sheath 30 so as to gather the surrounding tissues around the region close to each other.

In the tissue traction device 51, the first thread 22 is passed through the tubular main body 52. Therefore, when the sheath 30 is retracted to pull the main body 52 toward the hand side by the forceps or the like, the distal end portion of the main body 52 can be moved along the first thread 22 in a direction away from the fixation site F1 as shown in FIG. 11. Accordingly, even if the main body 52 is formed in the substantially linear shape, it is possible to sufficiently suppress the main body 52 from interfering with the high frequency knife 120 or the like when performing the full-thickness resection procedures or the like.

Figure 12:
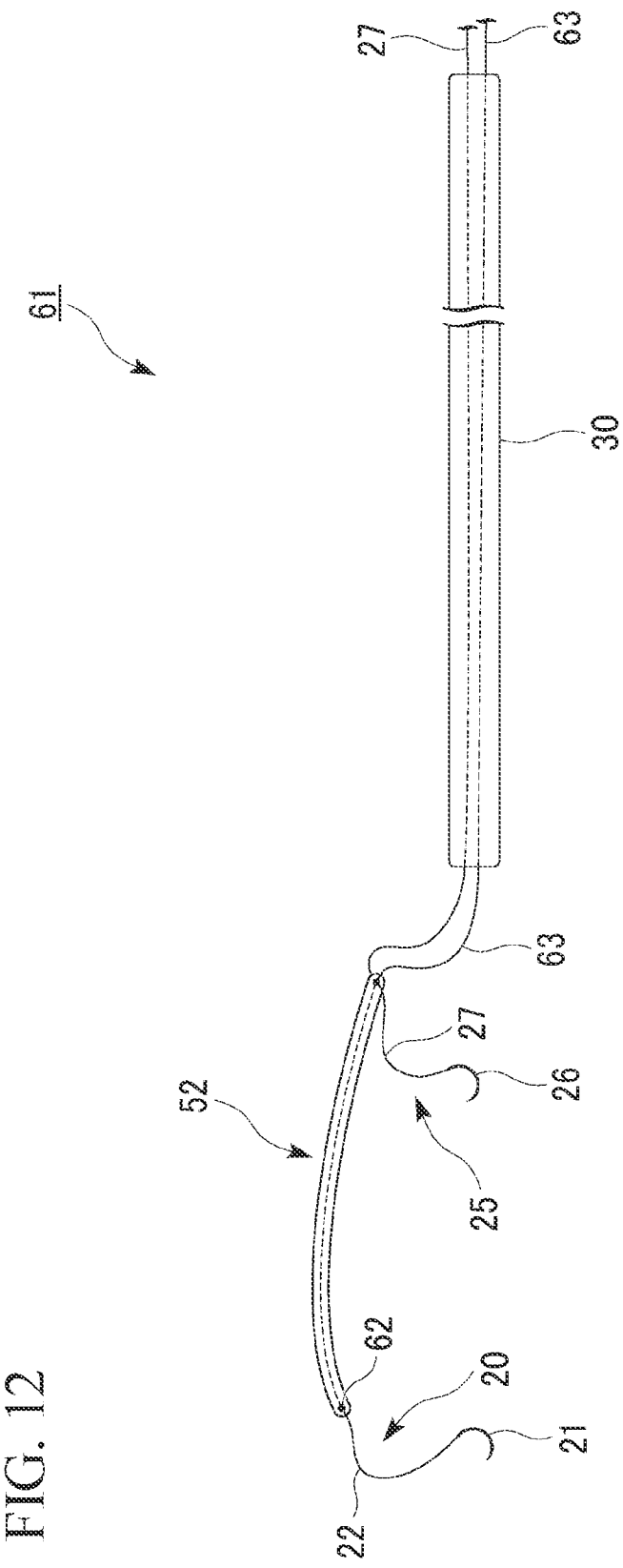
FIG. 12 is a view showing a modification example of the present tissue traction device.

According to the present embodiment, the first thread does not have to be passed through the main body 52. In the tissue traction device 61 according to the modification example shown in FIG. 12, an evacuation thread 63 is connected to the first thread 22 at the portion of the knot 62, and the evacuation thread 63 passes through the main body 52 and passes through the sheath 30.

Even with such a configuration, it is possible to move the main body 52 along the evacuation thread 63 and suppress the interference between the main body and the high-frequency knife or the like.

Although each embodiment of the present invention has been described above, the technical scope of the present invention is not limited to the above-described embodiment. The combination of components may be changed, various changes may be applied to each component, and the components may be deleted without departing from the spirit of the present disclosure.

Some changes are shown below; however not all changes are shown and other changes are possible. These changes may be combined as appropriate.

Figure 17:
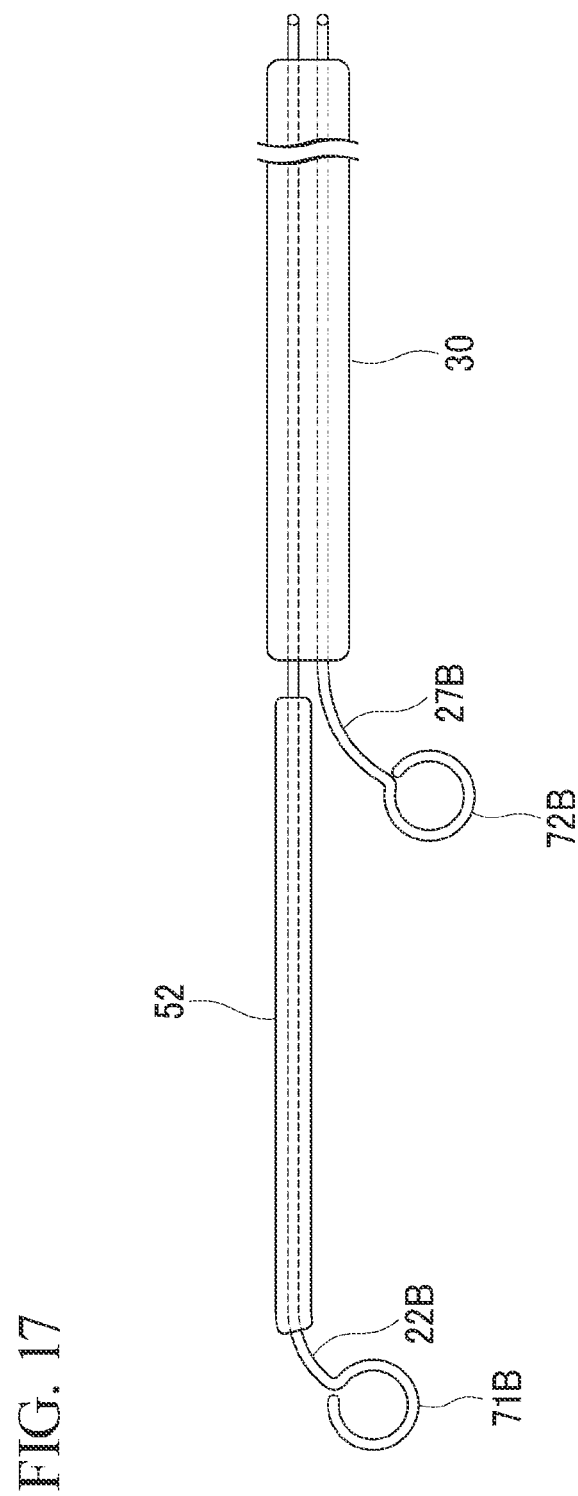
FIG. 17 is a view showing a tissue traction device according to a modification example of the second embodiment.

According to the second embodiment, the aspect of the fixing element is not limited to the needle and thread described above, and various structures can be adopted. According to the modification example shown in FIG. 17, the fixing elements are rings 71B, 72B. The ring 71B and the ring 72B are formed by forming a part of the first thread 22B and the second thread 27B into a ring shape, respectively.

Figure 13:
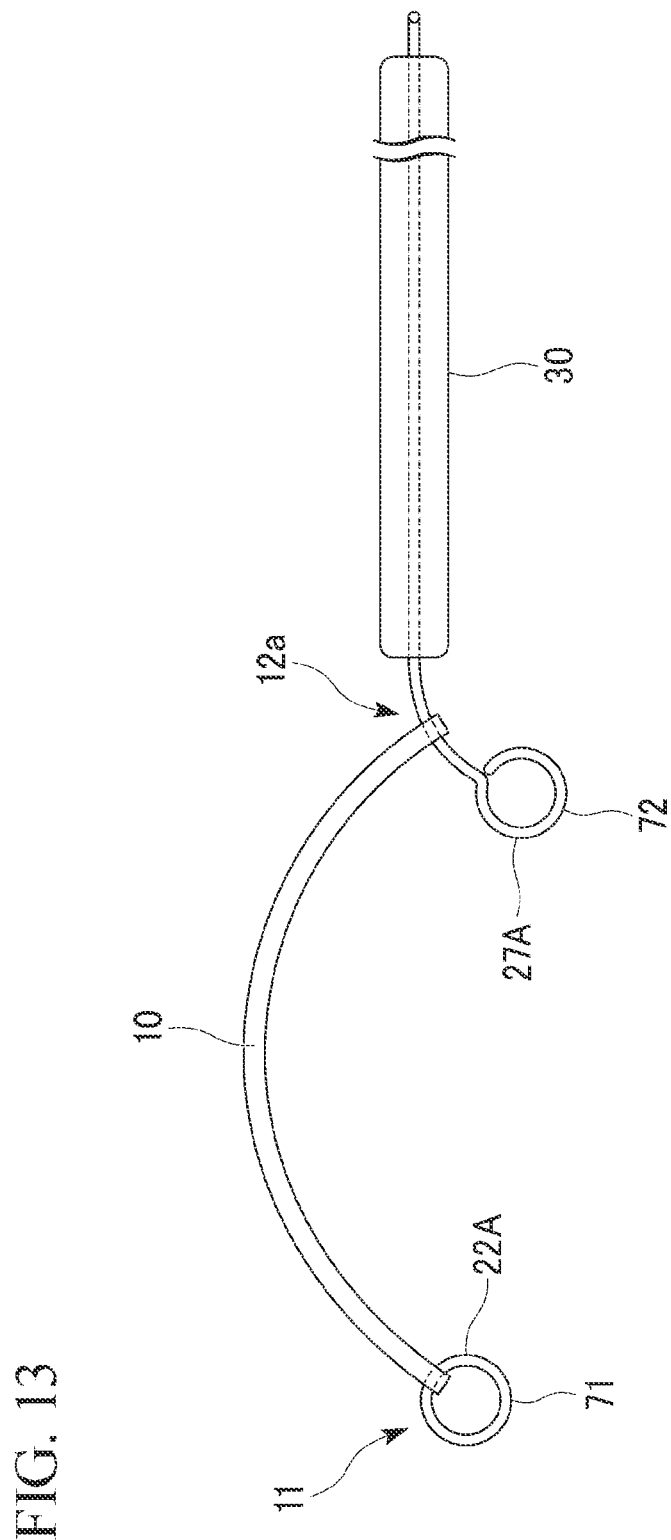
FIG. 13 is a view showing a tissue traction device according to a modification example of the first embodiment.

The first thread 22B is inserted into the sheath 30 to be freely advanceable and retractable, and the first thread 22B protruding from the distal end of the sheath 30 is inserted through the main body 52 to be freely advanceable and retractable between the ring 71B of the first thread 22B and the distal end of the sheath 30. The second thread 27B including the ring 72B protrudes from the distal end of the sheath 30. Then, similar to the modification example as shown in FIG. 13 and FIG. 14, the rings 71B, 72B can be locked to the tissues by ligating the tissue with a clip 75 or the like.

Figure 15:
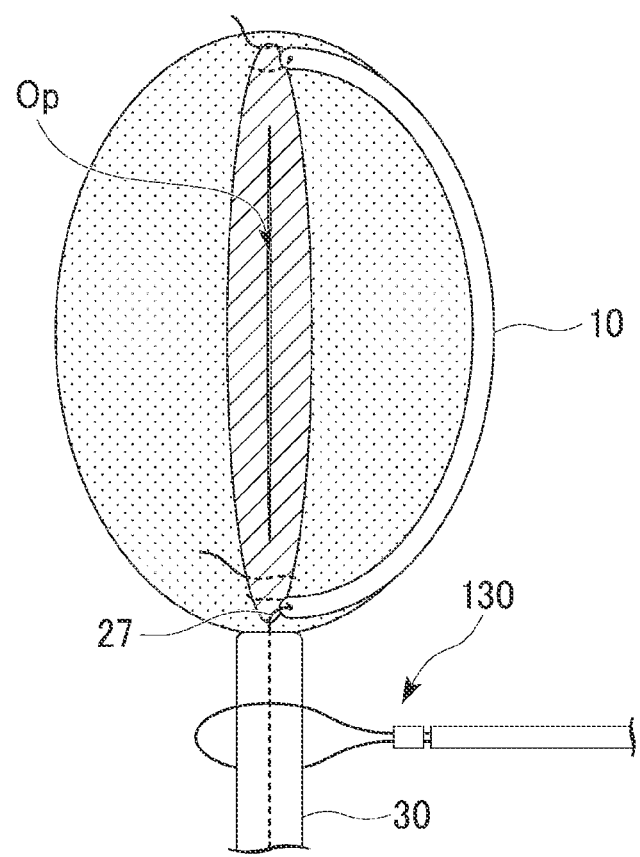
FIG. 15 is a view showing the procedures of the operation for conveniently maintaining a second bending shape.
Figure 16:
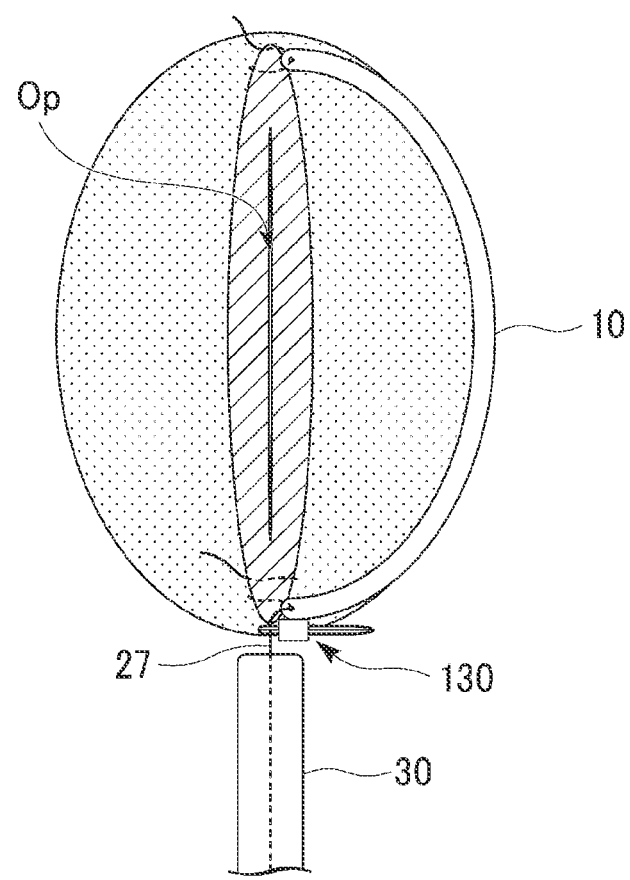
FIG. 16 is a view showing the procedures of the operation for conveniently maintaining the second bending shape.

As shown in FIG. 15, an indwelling snare 130 is hooked to the sheath 30 in advance, and as shown in FIG. 16, the second thread 27 between the main body 10 and the sheath 30 in a state in which the opening Op is stretched may be tied by the indwelling snare 130. In this manner, even if the hand is removed from the sheath 30, or the sheath 30 is removed to the outside of the body, the open opening Op can be maintained in the stretched state such that the operations of the user are simplified. In a case in which the lead 40 is sandwiched by a clip or the like instead of the indwelling snare, the state in which the opening Op is stretched can be maintained. The positional relationship between the sheath 30 and the second thread 27 may be fixed by fixing the second thread 27 to the operation portion. In this case, even if the user releases the sheath 30 without removing the sheath 30, the opening Op can be maintained in the stretched state.

Although the respective embodiments and modifications of the present disclosure have been described above, the technical scope of the present disclosure is not limited to the above-described embodiments, and configurations in the respective embodiments and modifications within the scope not departing from the spirit of the present disclosure. It is possible to change the combination of elements, make various changes to each configuration element, or delete each configuration element. For example, the configuration according to any one of above-described embodiments and modifications of the present disclosure may be appropriately combined with each modification of the operation section. The present disclosure is not limited by the above description, but only by the appended claims.

What is claimed is:

1. A tissue traction device, comprising:
a first needle connected to a distal end of a first thread;
a second needle connected to a distal end of a second thread;
an elongated main body connected to the first thread and extending between the first thread and the second thread, the main body including a first hole; and
a tube disposed at a proximal end of the main body,
wherein the second thread is inserted through the first hole to be advanceable and retractable at a position between the second needle and a distal end of the tube, and
the tube and the second thread are configured to be relatively movable in a longitudinal direction of the tube.

2. The tissue traction device according to claim 1, wherein the main body is connected to a proximal end of the first thread, and the main body extends between the proximal end of the first thread and a proximal end of the second thread.

3. The tissue traction device according to claim 1, wherein part of the second thread is inserted into the tube from a distal end portion of the tube and goes out from a proximal end portion of the tube.

4. The tissue traction device according to claim 1, wherein the main body is bent in an arc shape.

5. The tissue traction device according to claim 1, wherein the tube includes a second hole, and the second thread is inserted in the second hole to be advanceable and retractable.

6. A tissue traction device, comprising:
a first thread;
a second thread;
an elongated main body connected to the first thread and extending between the first thread and the second thread, the main body including a first hole; and
a tube disposed at a proximal end of the main body,
wherein each of the first thread and the second thread includes a ring-shaped portion,
the ring-shaped portion of the first thread protrudes from the main body,
the ring-shaped portion of the second thread protrudes from the tube,
the second thread is inserted through the first hole to be advanceable and retractable at a position between the ring-shaped portion of the second thread and a distal end of the tube, and
the tube and the second thread are configured to be relatively movable in a longitudinal direction of the tube.

7. The tissue traction device according to claim 6, wherein the main body is connected to a proximal end of the first thread, and the main body extends between the proximal end of the first thread and a proximal end of the second thread.

8. The tissue traction device according to claim 6, wherein part of the second thread is inserted into the tube from a distal end portion of the tube and goes out from a proximal end portion of the tube.

9. The tissue traction device according to claim 6, wherein the main body is bent in an arc shape.

10. The tissue traction device according to claim 6, wherein the tube includes a second hole, and the second thread is inserted in the second hole to be advanceable and retractable.

11. The tissue traction device according to claim 6,
wherein the first thread is inserted through the tube to be advanceable and retractable,
the first thread protruding from the distal end of the tube is inserted through the main body to be advanceable and retractable between the ring-shaped portion of the first thread and the distal end of the tube.

12. A usage method of a tissue traction device including a first thread, a second thread, and a tube, comprising:
fixing the first thread to a first fixation site of a luminal organ;
fixing the second thread to a second fixation site of the luminal organ;
forming an opening by resecting tissues between the first fixation site and the second fixation site;
relatively moving the tube and the second thread to increase a distance between the first fixation site and the second fixation site so as to elongatedly stretch the opening, and
performing treatment to surrounding tissues and closing the opening.

13. The usage method of a tissue traction device according to claim 12, wherein the first thread is fixed to the first fixation site after forming the opening.

14. The usage method of a tissue traction device according to claim 12, wherein the opening is formed after fixing the first thread to the first fixation site.

* * * * *